Patented Jan. 5, 1943

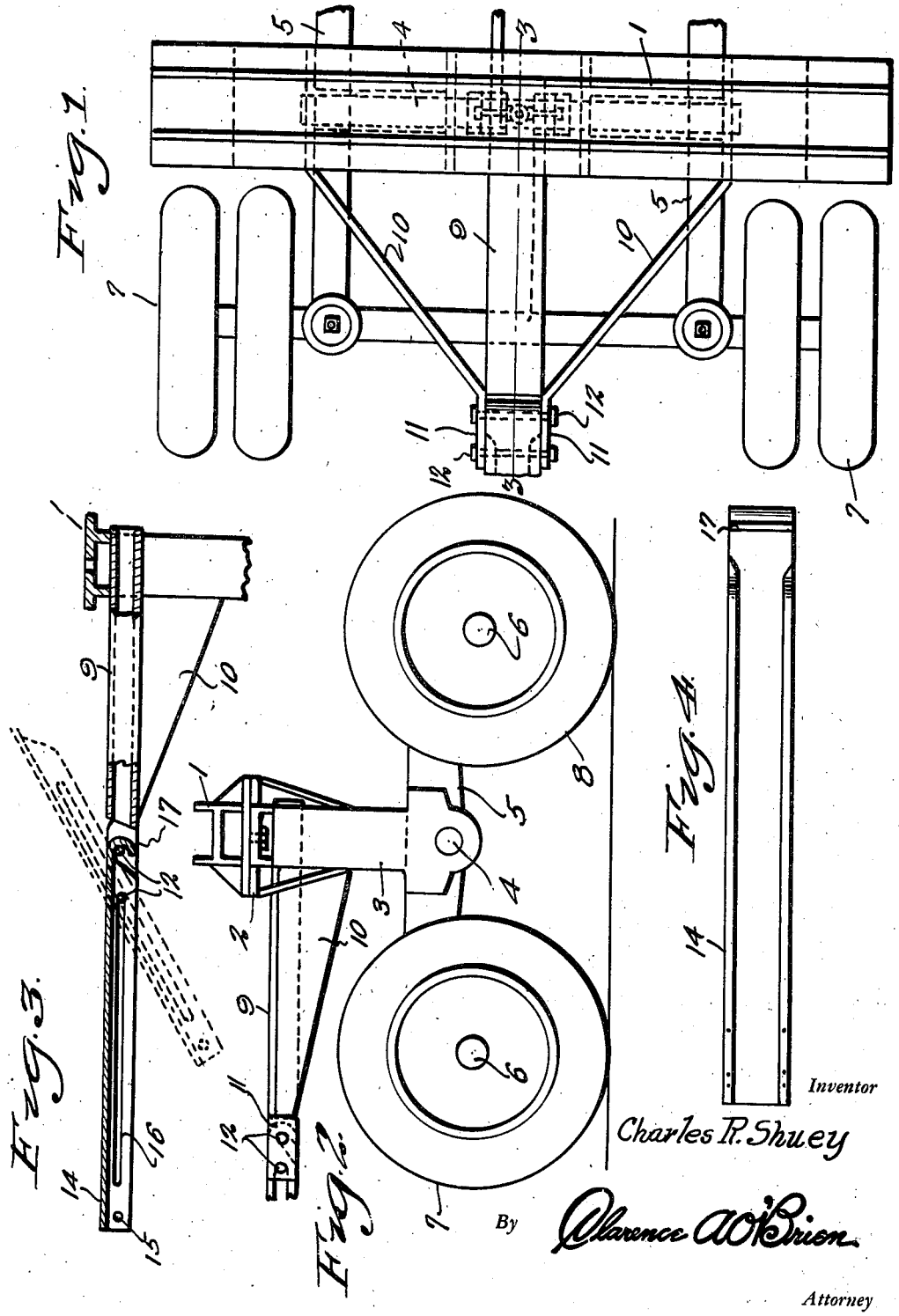

2,307,472

UNITED STATES PATENT OFFICE 2,307,472

TOW BAR FOR TRAILERS

Charles R. Shuey, La Grande, Oreg.

Original application January 2, 1940, Serial No. 312,121. Divided and this application July 23, 1941, Serial No. 403,728

1 Claim. (Cl. 280—33.14)

My invention relates to improvements in tow bars for trailer logging bunks, more particularly of the type forming the subject matter of my copending application Serial No. 312,121, filed January 2, 1940, eventuating into U. S. Patent No. 2,555,863, dated September 16, 1941 and of which the instant application is a division.

An object of the instant invention is to equip such trailers with a sliding, sectional tongue connected to the bolster support and adapted to facilitate the loading of the trailer on the rear end of a truck for convenient transportation of the trailer when not in use.

To the accomplishment of the above, and the subordinate objects presently appearing, the preferred embodiment of my invention has been illustrated in the accompanying drawing, set forth in detail in the succeeding description, and defined in the claim appended hereto.

In said drawing:

Figure 1 is a fragmentary view in top plan illustrating a portion of the trailer equipped according to the preferred embodiment of the invention, Figure 2 is a view in side elevation, Figure 3 is a fragmentary view in longitudinal section taken on the line 3—3 of Figure 1 and drawn to an enlarged scale, and Figure 4 is a view in bottom plan of one of the tongue sections.

Reference being had to the drawing by numerals, briefly described, the trailer logging bunk with which the instant invention is more particularly concerned is characterized by a cross bolster 1 surmounting a bolster carrying platform 2 supported by upright supports, one of which is shown at 3, fast at lower ends thereof on a transverse rock shaft 4 suitably mounted on a pair of side frame members 5 intermediate the ends of the latter. The frame members 5 are mounted on a pair of axles 6 arranged upon opposite sides of the rock shaft 4, respectively, and supported by pairs of ground wheels 7, 8, respectively, arranged in tandem. For further details of the trailer reference may be had to my copending application, supra.

In accordance with the instant invention, a stationary tongue section 9 is attached, in any suitable manner, at its rear to the bolster carrying platform 2, the opposite sides of the section, adjacent its forward end having brace members 10 attached thereto, the rear ends of the brace members being suitably secured to the supports 3. The front end of the tongue section 9 is welded to the parallel front ends 11 of the brace members 10, the welding not being shown, said ends 11 projecting forwardly of said braces parallel and being provided with a pair of transverse front and rear pins 12, 13 therein. A tongue section 14 of channel form, transversely, is provided with an opening 15 adjacent its front end for attaching to a truck, not shown, the sides of the section 14 having longitudinally extending slots therein as shown at 16 for slidably mounting the tongue section 14 on the front pins 12. The rear end of the tongue section 14 is provided with a downturned hook 17 for hooking over the rear pin 13 when the tongue sections are in longitudinal aligned horizontal position as shown in full lines in Figures 2 and 3. The hook 17 may be disengaged from the pin 13 and the tongue section 14 moved into the rearwardly slid, downwardly and forwardly inclined position shown in dotted lines in Figure 3, whereby the trailer may be hoisted upon a truck for transportation therein.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

A trailer tow pole comprising a sectional tongue including a rigid rear section extending forwardly from the trailer, a pair of braces extending forwardly from said trailer upon opposite sides of said section and to which the front end of said section is attached, said braces having front ends extending forwardly of the front end of said section from opposite sides thereof, a pair of front and rear coplanar pins extending laterally through said front ends of said braces, and a swingable front tongue section of channel form including side flanges, said flanges fitting between the front ends of said braces and having longitudinal slots therein through which said front pin is extended whereby said front section is vertically swingable and longitudinally slidable on said front pin, said front section having a downturned rear end hook spaced from said flanges to hook over said rear pin and lock the front section against swinging and forward sliding and which is adapted for detachment from said rear pin upon rearward sliding of said front section to unlock the latter for vertical swinging.

CHARLES R. SHUEY.